United States Patent [19]

Grudzinskas

[11] Patent Number: 4,619,481
[45] Date of Patent: Oct. 28, 1986

[54] INFLATABLE SEAT CUSHION ASSEMBLY

[76] Inventor: Charles A. Grudzinskas, 3990 McCabe Ave., NE., Ada, Mich. 49301

[21] Appl. No.: 614,270

[22] Filed: May 25, 1984

Related U.S. Application Data

[63] Continuation-in-part of Ser. No. 449,853, Dec. 15, 1982, abandoned.

[51] Int. Cl.$^4$ .............................................. A47C 7/42
[52] U.S. Cl. ....................................... 297/284; 5/453; 137/883; 297/DIG. 3
[58] Field of Search ........................ 297/284, DIG. 3; 137/310, 883; 417/38, 44; 5/453–456; 200/82 R, 82 A, 82 C

[56]  References Cited

U.S. PATENT DOCUMENTS

| | | |
|---|---|---|
| 2,501,660 | 3/1950 | Bohle ................. 200/82 R |
| 3,136,577 | 6/1964 | Richard . |
| 3,192,541 | 7/1965 | Moore . |
| 3,326,601 | 6/1967 | Vanderbilt et al. . |
| 3,363,715 | 1/1968 | Langdon ............. 200/82 R X |
| 3,363,941 | 1/1968 | Wierwille . |
| 3,406,800 | 10/1968 | Buchanan et al. ..... 200/82 R X |
| 3,587,568 | 6/1971 | Thomas ............. 5/453 X |
| 3,652,126 | 3/1972 | Folling . |
| 3,795,021 | 3/1974 | Moniot ............. 5/453 X |
| 3,867,732 | 2/1975 | Morrell . |
| 3,888,603 | 6/1975 | Nagase ............. 417/44 X |
| 3,982,786 | 9/1976 | Burgin et al. . |
| 4,059,909 | 11/1977 | Kron . |
| 4,078,842 | 3/1978 | Zur . |
| 4,114,214 | 9/1978 | Von Heck .......... 297/284 X |
| 4,190,286 | 2/1980 | Bentley . |
| 4,306,590 | 12/1981 | Boudreau .......... 137/883 X |
| 4,335,999 | 6/1982 | Lamontagne et al. ..... 417/38 |
| 4,432,392 | 2/1984 | Paley ................. 137/883 |
| 4,491,364 | 1/1985 | Hattori et al. ........ 297/284 |

FOREIGN PATENT DOCUMENTS

| | | |
|---|---|---|
| 2333941 | 1/1974 | Fed. Rep. of Germany . |
| 351848 | 3/1961 | Switzerland .......... 200/82 R |

Primary Examiner—William E. Lyddane
Assistant Examiner—James R. Brittain
Attorney, Agent, or Firm—Price, Heneveld, Huizenga & Cooper

[57] ABSTRACT

An inflatable seat cushion assembly includes a seat cushion having a plurality of inflatable compartments and a manifold block having integrally formed therewith a pressure manifold with a common inlet for connecting to a source of pressurized fluid and a plurality of lateral outlets, each for establishing fluid communication between the fluid source and one of the compartments through one of the inlets. An exhaust manifold is also integrally formed with the manifold block. The exhaust manifold has a common outlet for exhaust of spent fluid from the compartment and a plurality of lateral inlets, each for establishing fluid communication between the compartments and the common outlet. The exhaust manifold is separate from the pressure manifold. Control valves are positioned between each lateral inlet and a corresponding lateral outlet. Each control valve is selectively adjustable among positions where its associated compartment communicates with the lateral inlet for inflating the compartment; where the associated compartment communicates with the corresponding lateral outlet for deflating the associated compartment through the exhaust manifold; and where the associated compartment communicates with neither the pressure source nor the exhaust for maintaining the associated compartment at the desired pressure.

11 Claims, 24 Drawing Figures

INFLATABLE SEAT CUSHION ASSEMBLY

CROSS REFERENCE TO RELATED APPLICATION

This application is a continuation-in-part of my application Ser. No. 449,853, entitled Pneumatic Comfort Cushion, filed on Dec. 15, 1982 now abandoned.

BACKGROUND OF THE INVENTION

The present invention relates to inflatable cushions for chairs and to valves therefor. Inflatable seat and chair cushions have typically included a seat cushion having a plurality of inflatable compartments which are positioned at various points along the chair back or seat portion. Each inflatable cushion is selectively inflatable so as to increase or decrease the firmness of various parts of the chair cushion.

Inflatable chair cushion assemblies have heretofore had serious drawbacks which have hindered their widespread acceptance. Some are provided with a valve structure which connects each of the pressurized compartments with a common exhaust manifold with no means for preventing pressurized fluid from one compartment from escaping from that compartment, flowing through the manifold and pressurizing another compartment. Therefore, all of the compartments will eventually have the same pressure, making it difficult to selectively adjust the pressure in each of the cushions for selective body support.

In other assemblies, each of the cushion compartments is connected to a common pressure manifold with check valves between the manifold and each of the cushion compartments to prevent one cushion compartment from inflating another. However, with check valves, the pressure manifold is connected to a common source of pressure which will inflate each of the cushions to the same pressure. If a master pressure control valve is provided between the constant pressure source and the common pressure manifold, then in order to fill each compartment to a desired pressure different from the others, the user must (1) adjust the master control valve such that the delivered pressure is the pressure of the cushion to have the highest pressure; (2) fill all of the cushion compartments to that presure; (3) readjust the master control valve such that the pressure delivered is no more than that of the cushion compartment to have the lowest pressure; and then (4) exhaust air from each of the cushion compartments selectively through exhaust valves associated with each cushion compartment to obtain the desired pressure differences among the cushion compartments. Thus, several valves must be operated to fill each cushion compartment to a pressure different from the others. This operation procedure is unduly complicated, especially if the inflatable seat cushion assembly is to be used in an automobile where the driver's concentration must be focused on where he is going, not on the subtleties of operating a complicated inflatable seat cushion.

There are inflatable seat cushions which are easier to operate than those described above, but they are mechanically complicated. For example, an inflatable seat cushion assembly wherein each of a plurality of seat cushion compartments can be adjusted simply by turning a lever-like slide valve has been disclosed. However, the slide valves are extremely complicated to construct. Each of the slide valves employs a plurality of opposed springs to hold the valve slide member in a proper position. Furthermore, microswitches are provided for each of the slide valves to operate an air compressor each time one of the slide valves is moved to the "fill" position. Therefore, such designs are impractical to construct.

Examples of prior patented inflatable seat cushions may be found in U.S. Pat. No. 4,078,842 entitled Kit for Inflatable Full-Length Body Supporting Seat, issued on Mar. 14, 1978 to Zur; U.S. Pat. No. 3,363,941, entitled Air Inflated Automobile Seat, issued on Jan. 16, 1968 to Wierwille; and U.S. Pat. No. 3,326,601, entitled Inflatable Back Support for a Seat, issued on June 20, 1967 to Vanderbilt. A need exists for an inflatable seat by which the aforementioned problems are solved.

SUMMARY OF THE INVENTION

The present invention is an inflatable seat cushion assembly which includes a seat cushion having a plurality of inflatable compartments. A manifold block is included which has integrally formed therewith a pressure manifold with a common pressure inlet for connection to a pressurized fluid source and a lateral pressure outlet for each compartment, each pressure outlet for establishing fluid communication between the fluid source and one of the compartments through the common inlet. An exhaust manifold is also integrally formed with the manifold block and includes a common exhaust outlet for exhaust of fluid from the cushion compartments and a lateral exhaust inlet for each compartment, each for establishing fluid communication between a cushion compartment and the common exhaust outlet. The exhaust manifold is separate from the pressure manifold. A connector conduit for each compartment is also integrally formed in the manifold block with one end of each connector conduit being connected to its associated compartment. A control valve is positioned at each juncture of a lateral exhaust inlet, a corresponding lateral pressure outlet and the other end of a connector conduit. Each control valve is selectively adjustable among positions where (1) the lateral pressure outlet associated with the valve communicates with its associated compartment through a connector conduit for inflating the associated compartment; where (2) the associated compartment communicates with the lateral inlet associated with the control valve through a connector conduit for deflating the associated compartment through the exhaust manifold; and where (3) the associated compartment communicates with neither the pressure source nor the exhaust for maintaining the compartment at the desired pressure.

The seat cushion assembly is easy to operate inasmuch as the pressure of each compartment is selectively adjusted independently of the others by a separate valve. Furthermore, it is easy to construct since the connector conduits and the pressure and exhaust manifolds are integrally molded and can be in the form of grooves in the manifold block with one or more covers covering the grooves to form manifold and connector conduits between the grooves and the cover plate. Therefore, the control valve structure can be molded from plastic with the grooves integrally molded therewith. The connector conduits and the pressure and exhaust manifolds may be formed by cover plates covering the integrally molded grooves. The device is extremely easy to manufacture.

DETAILED DESCRIPTION OF THE PREFERRED EMBODIMENT

Figures 1, 2, 3, 4:
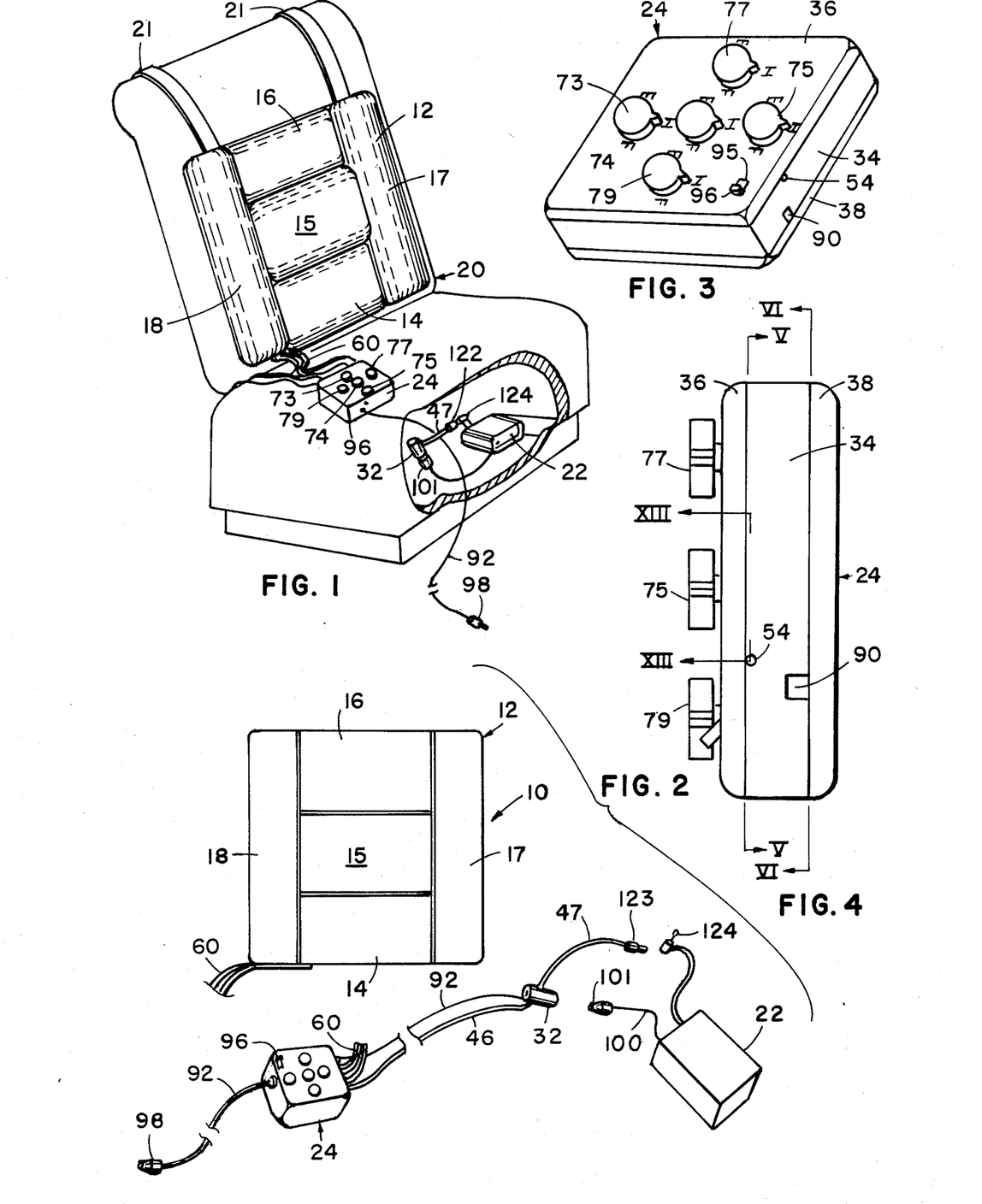
FIG. 1 is a partially broken perspective view of the inflatable seat cushion assembly of the present invention mounted on a car seat.
FIG. 2 is an exploded perspective view of the components of the inflatable seat cushion assembly of the present invention.
FIG. 3 is a perspective view of the control valve assembly of the present invention.
FIG. 4 is an end view of the control valve assembly of the present invention.

A preferred embodiment of an inflatable seat cushion assembly in accordance with the present invention is illustrated in FIGS. 1 and 2 and generally designated 10. Assembly 10 includes a cushion 12 having a plurality of individually inflatable compartments 14–18. The seat cushion can be mounted on the back of an automobile seat 20 by straps 21 (FIG. 1). An air compressor 22 supplies compressed air to a control valve assembly 24 which has a plurality of control valves 26–30 (FIG. 5) for individually inflating or deflating each of the cushion compartments 14–18. Therefore, each of the cushion compartments 14–18 can selectively be filled to the desired pressure by actuating one of the control valves 26–30. An automatic pressure cutoff switch 32 deactivates compressor 22 when the desired maximum pressure has been reached in any one of the compartments being filled by the compressor.

The control valve assembly 24 includes a manifold block 34 with upper cover plate 36 covering an upper surface 40 of the block and a lower cover plate 38 covering a lower surface 56 of the block (FIGS. 3, 4). The upper face 40 of manifold block 34, covered by upper cover plate 36, has integrally formed thereon pressure manifold grooves 42a–d which have a common pressure inlet 44 which is connected by tubes 46 and 47 (FIG. 2) to the pressure outlet of compressor 22. Pressure manifold grooves 42 each terminate in a lateral pressure outlet 48.

Upper face 40 of manifold block 34 also has integrally formed thereon a plurality of exhaust manifold grooves 50 which together with the upper cover plate 36 form an exhaust manifold. Exhaust manifold grooves 50a–c terminate in a plurality of lateral exhaust inlets 52. The exhaust manifold also has a common exhaust outlet 54 for exhaust of spent fluid from each of the cushion compartments selectively.

Figure 6:
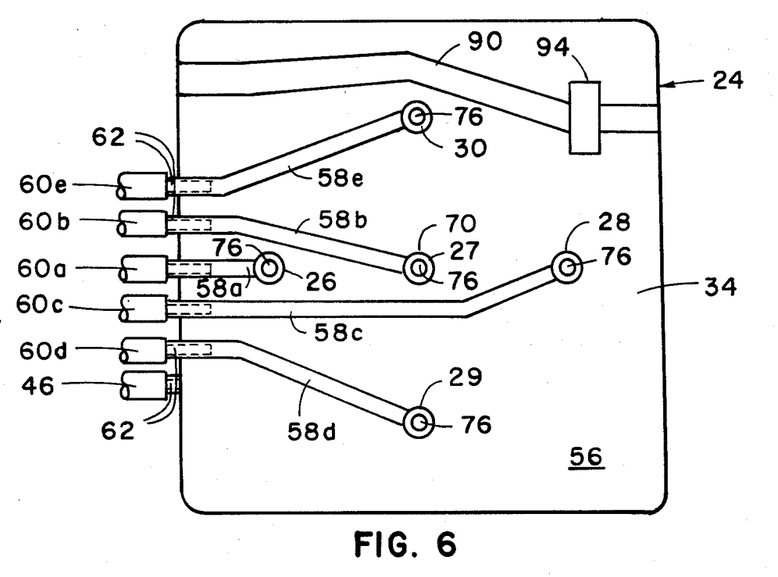
FIG. 6 is a cross section taken along the plane of line VI—VI of FIG. 4.
Figure 8:
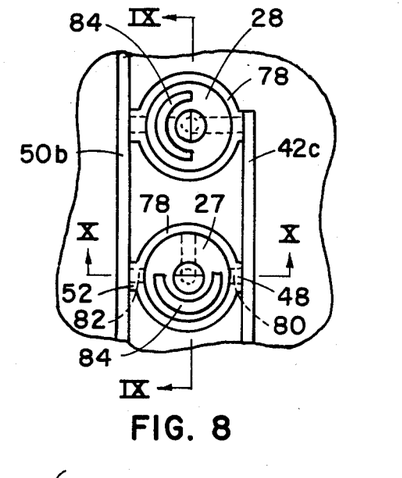
FIG. 8 is a detailed top view of two valves of the control valve assembly of the present invention with the top cover and control valve knobs removed.
Figure 15:
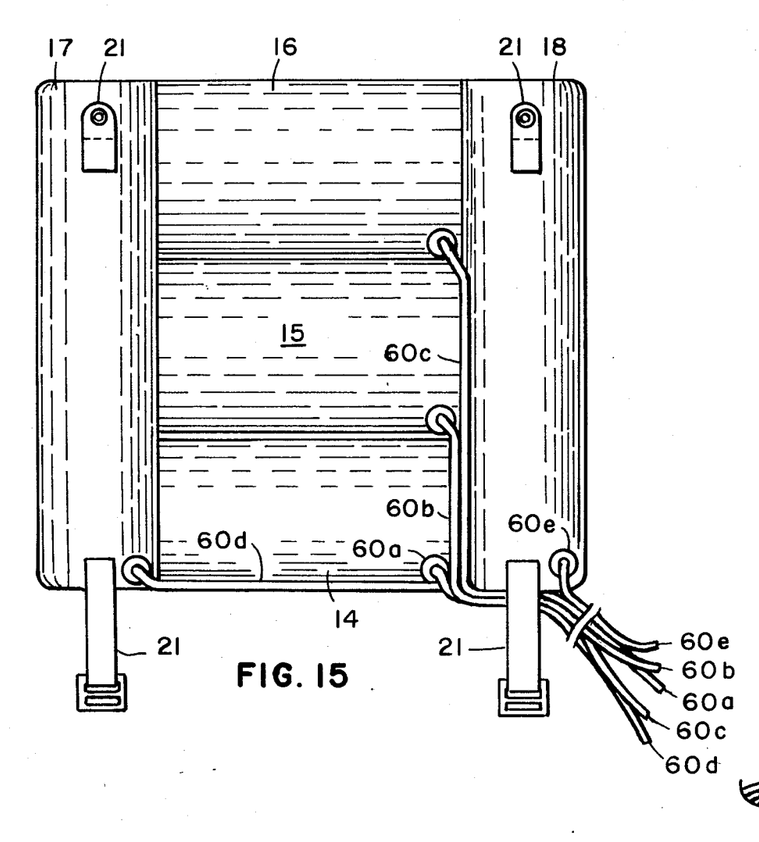
FIG. 15 is a rear elevation of an inflatable seat cushion.
Figure 16:
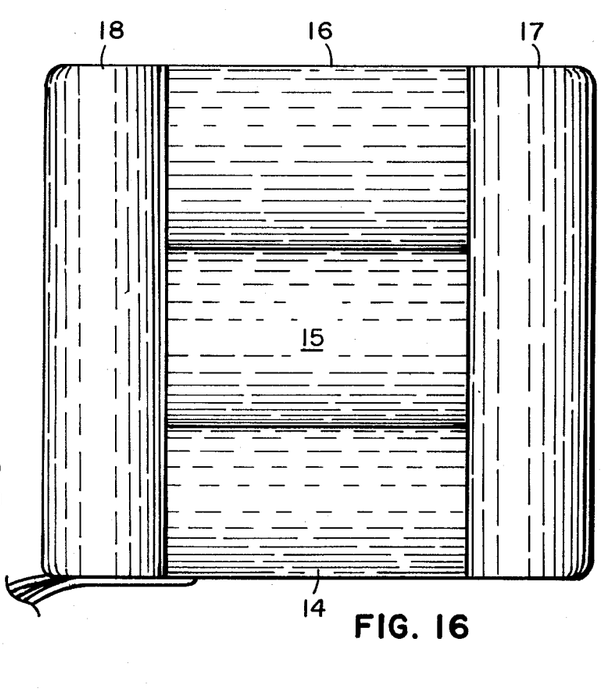
FIG. 16 is a front elevation of an inflatable seat cushion.
Figure 17:
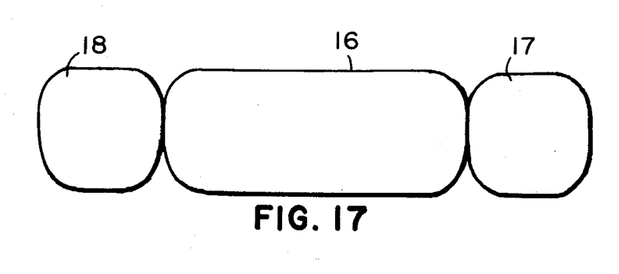
FIG. 17 is a top elevation of an inflatable seat cushion.

Bottom face 56 of manifold block 34 has integrally formed thereon a plurality of connector conduit grooves 58a–e, each of which connects a valve 26–30, respectively, to an inflatable compartment 14–18, respectively, by a tube 60 (FIGS. 2, 6 and 15). Each connector conduit 58a–e is connected by a tube 60a–e, respectively, to a compartment 14–17, respectively (FIGS. 6 and 15). A small tubular connector 62 connects each tube 60 to its associated connector conduit groove 58.

Thus, the manifold grooves and connector conduit grooves can be molded integrally with the manifold block, and the manifolds and connector conduits formed simply by securing cover plates to the upper and lower faces of the block. Accordingly, the entire fluid distribution system is easily manufactured.

Figure 9:
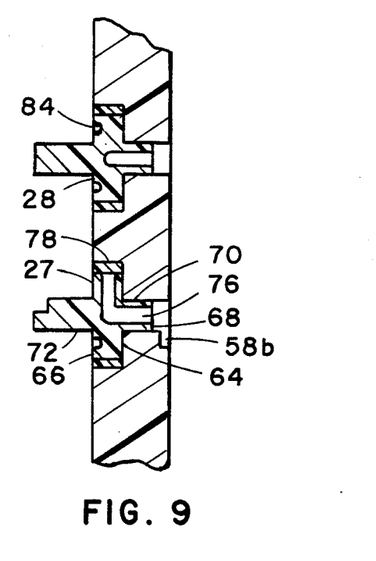
FIG. 9 is a cross section taken along the plane of line IX—IX of FIG. 8.
Figures 10, 11:
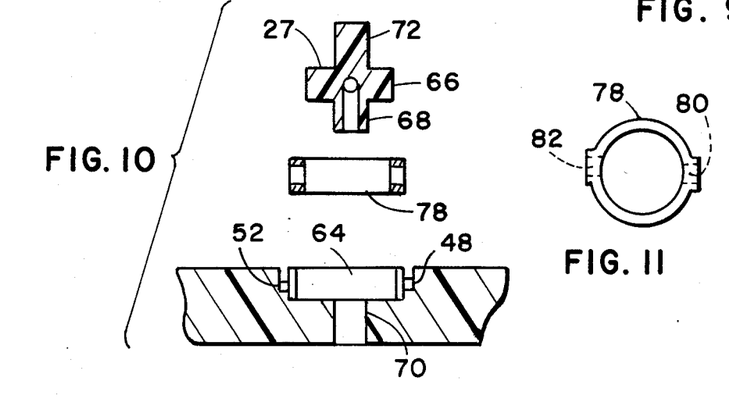
FIG. 10 is an exploded cross-sectional view taken along the plane of line X—X of FIG. 8.
FIG. 11 is a top view of a valve seal used in the control valve assembly of the present invention.
Figure 12:
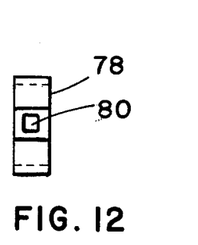
FIG. 12 is a side view of a valve seal used in the control valve assembly of the present invention.

Valves 26–30 are substantially identical to each other, so only one of them needs to be described in detail. As shown in FIGS. 5–9, for instance, valve 27 is positioned between lateral pressure outlet 48 and lateral exhaust inlet 52 in a circular recess 64. Valve 27 has a spool-like body 66 seated within the circular recess 64 and a tubular portion 68 which extends downwardly into an aperture 70 which connects recess 64 with connector conduit groove 58b (FIG. 9). A shank 72 extends upwardly from spool 66 and is connected to a control knob 74 for turning valve 27 (FIG. 3).

Valve 27 has an L-shaped passage 76 therethrough, one arm of which extends through tubular portion 68, and the other arm of which extends radially through spool body 66 and opens through the side of the spool body (FIG. 9). An annular gasket 78 made of a resilient polymeric material (FIGS. 8–12) is positioned tightly around spool body 66 between spool body 66 and the sides of recess 64. Gasket 78 includes two opposed openings 80 and 82 which are aligned with lateral outlet 48 and lateral inlet 52, respectively.

Figures 5, 7:
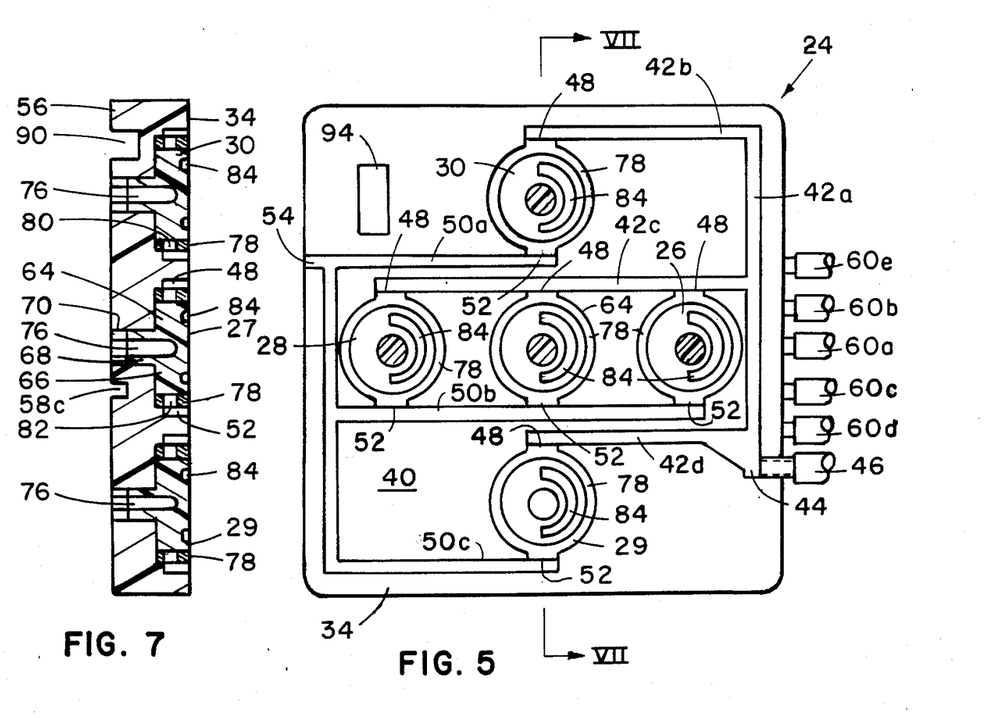
FIG. 5 is a cross section taken along the plane of line V—V of FIG. 4.
FIG. 7 is a partially broken cross section taken along the plane of line VII—VII of FIG. 5.

When the inflatable cushion compartment associated with valve 27, namely, compartment 15, is to be inflated, valve 27 is rotated within gasket 78 such that the opening of passage 76 in the side of spool body 66 is aligned with lateral pressure outlet 48 of the pressure manifold. If compartment 15 is below the maximum pressure, cutoff switch 32 will activate compressor 22. When compressor 22 is activated, air will be forced through the pressure manifold out of lateral pressure outlet 48, through L-shaped passage 76 and into connector conduit groove 58b. Since connector conduit 58b is connected to tube 60b, compartment 15 will inflate (FIGS. 5, 6 and 15).

When compartment 15 reaches the desired pressure, valve 27 can be rotated to the position shown in FIG. 9 where the opening in the side of spool body 66 is positioned against the inside surface of gasket 78. Since spool body 66 is tightly received within gasket 78, no air can flow into or out of L-shaped passage 76 maintaining compartment 15 at the desired pressure, since air cannot flow from connector conduit 58b or tube 60b past valve 27.

When one wishes to deflate compartment 15, spool valve 27 is rotated such that L-shaped passage 76 is aligned with lateral exhaust inlet 52 of exhaust manifold groove 50b. When valve 27 is in this position, air will flow from compartment 15 through tube 60b into connector conduit or groove 58b, back through L-shaped passage 76 and be exhausted through common outlet 54 of the exhaust manifold.

It is evident, therefore, that any one of the seat cushion compartments can be selectively inflated or deflated to a desired firmness simply by rotating an adjustment knob, valve 26 having a control knob 73, valve 27 having a control knob 74, valve 28 having a control knob 75, valve 29 having a control knob 77, and valve 30 having a control knob 79 (FIG. 3).

Figure 13:
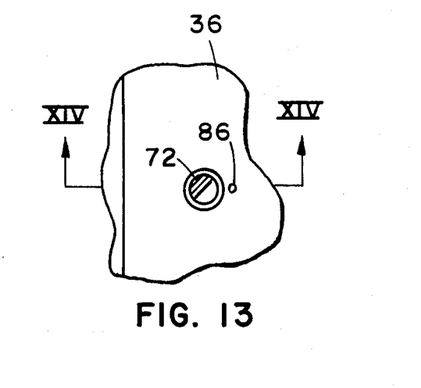
FIG. 13 is a cross-sectional view taken along the plane of line XIII—XIII of FIG. 4.
Figure 14:
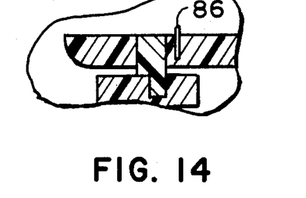
FIG. 14 is a cross section taken along the plane of line XIV—XIV of FIG. 13.

Each spool valve 26–30 also includes an arcuate keying groove 84 across its top surface. A keying pin 86 (FIGS. 13 and 14) extends downwardly from the bottom of cover plate 36 into each keying groove 84. Each keying pin 86 is positioned with respect to its keying groove 84 such that its associated valve can travel only the 180° between the "fill" and "empty" positions between the lateral pressure outlet 48 and lateral exhaust inlet 52, respectively, associated therewith. Each keying groove being a 180° arc, each keying pin 86 prevents each valve from being rotated beyond these two positions. Accordingly, the keying pins will provide a clear indication as to when the fill and empty positions are selected for each of the valves. Any intermediate or "hold" position between the two fill and empty positions will be acceptable to maintain each of the seat cushion compartments at the desired pressure.

Top cover 36 is provided with a plurality of apertures 88 through which shanks 72 of spool valves 26–30 extend. Cover 36 can be adhesively secured to upper face 40 of manifold block 34 to create a strong seal isolating each of the manifold conduits formed by manifold grooves 42 from each other and from the arms of the exhaust manifold formed by exhaust manifold grooves 50. Alternatively, upper cover plate 36 can be fastened by fasteners to upper face 40 of manifold block 34 with a gasket (not shown) made from a resilient material disposed between plate 36 and block 34 to create the seal. Lower cover plate 38 can be secured to the lower face of manifold block 34 in either of the two above ways.

The lower surface of manifold block 34 also contains an electrical conduit groove 90 (FIGS. 3, 4 and 6) which extends across manifold block 34. Electrical wires 92 for supplying electrical energy to compressor 22 extend through groove 90 to a slot 94 in which an electrical switch 96 is positioned for supplying power to compressor 22. Switch 96 has a toggle which projects through an opening 95 in top cover 36, as shown in FIG. 3.

Figure 18:
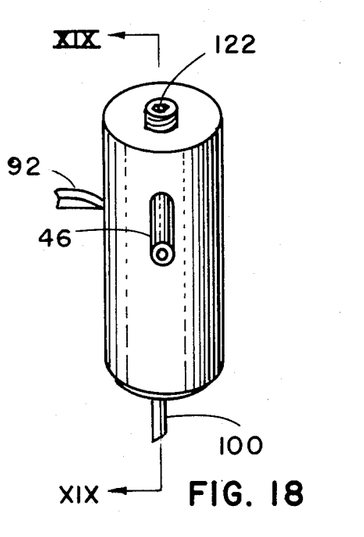
FIG. 18 is a perspective view of an automatic pressure control switch used with the seat cushion assembly of the present invention.
Figure 19:
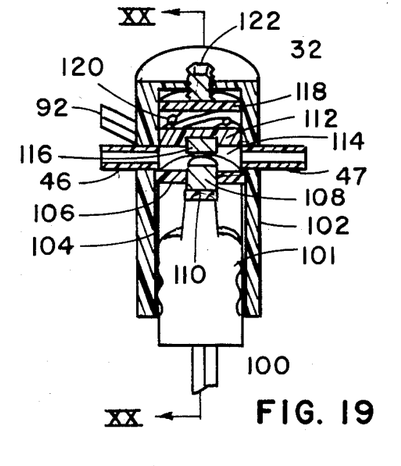
FIG. 19 is a cross section taken along the plane of line XIX—XIX of FIG. 18.

The ends of wires 92 are connected to an adapter 98 which can be inserted into a cigarette lighter socket to supply power from the car battery to the compressor in a manner to be described. The other ends of wires 92 are connected to a pressure cutoff switch valve 32, shown in FIG. 2 but illustrated in detail in FIGS. 18–20.

Figure 20:
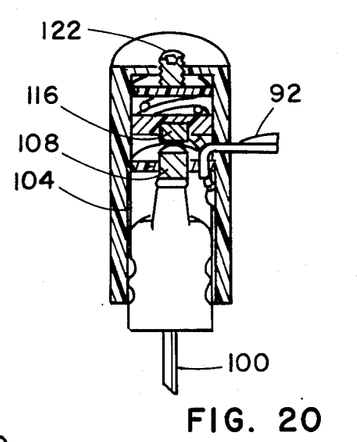
FIG. 20 is a cross section taken along the plane of line XX—XX of FIG. 19.

The power cord 100 of compressor 22 includes an adapter 101 which is also adapted to be received within a cigarette lighter socket, compressor 22 being of a standard type commonly available on the market for use in inflating tires in emergency situations. Adapter 101 inserts into the open end of a cylindrical body 102 of the pressure cutoff switch. The open end of body 102 includes a metallic cylindrical sleeve contact 104 positioned along the inside surfaces of cylindrical body 102 and electrically connected to one of wires 92 (FIG. 20). As with any conventional type of cigarette lighter socket adapter 101, the exterior cylindrical surface thereof is provided with one or more contacts (not shown) which electrically contact sleeve 104 completing a circuit between one of wires 92 and one of wires 100 which supply power to the air compressor.

Disposed intermediate the ends of cylindrical body 102 at the bottom of sleeve contact 104 is an insulating, gas-tight partition 106 which includes an electrical contact 108 which extends therethrough. Electrical contact 108 contacts a contact 110 at the tip of adapter 101, contact 110 being electrically connected to the other wires 100 which supply power to compressor 22.

Positioned above partition 106 in cylindrical body 102 is a slidable piston member 112. Between partition 106 and piston 112 is formed a pressure chamber 114. A compressed air line 47 from compressor 22 supplies compressed air from the compressor into pressure chamber 114, and tube 46 connected to pressure manifold 42 receives compressed air from pressure chamber 114.

Piston 112 carries an electrical contact 116 which is oriented toward contact 108 on partition 106 and connected to the other of wires 92. Piston 112 sealingly engages the inside walls of cylindrical body 102 so that the pressurized air within chamber 114 cannot escape past piston 112. A coil spring 120 is biased between piston 112 and a movable stop 118 positioned near the end of cylindrical body 102. Coil spring 120 biases piston 112 toward partition 106 such that contacts 116 and 108 can normally contact, permitting a circuit to be completed between adapter 98 and compressor 22. However, when the pressure in chamber 114 rises above a preselected maximum, the pressure within chamber 114 will force piston 112 to compress spring 120 and move away from contact 108 opening the circuit between adapter 98 and compressor 22, thereby opening the circuit which supplies electrical energy to compressor 22.

The maximum ultimate pressure allowed to be generated by compressor 22 should be that which prevents any one of the compartments from exploding. Of course, there will be a maximum pressure below the explosion pressure set for comfort considerations since the ultimate maximum would make the cushion compartments too hard for comfortable seating.

The maximum allowable pressure can be adjusted by a set screw 122 which extends through a threaded opening through the closed end of cylindrical body 102 and abuts against the side of stop 118 opposite from spring 120. When set screw 122 is threaded inwardly of body 102, stop 118 will compress spring 120, thereby increasing the maximum pressure required to separate contacts 108 and 116 to turn off compressor 22. When set screw 122 is threaded outwardly of body 102, spring 120 will be decompressed, thereby decreasing the pressure in chamber 114 required to separate contacts 108 and 116.

Pressure line 47 includes a conventional air fill valve 123 which connects to a conventional air fill valve coupler 124 on compressor 22. Coupler 124 should be of the type which locks onto valve 123 so that continuous fluid communication can be maintained between compressor 22 and control valve assembly 24.

Accordingly, it is evident from the description of the embodiment shown in FIGS. 1–20 that the seat cushion assembly is well adapted to be used with a conventional air compressor commonly available on the market and can conveniently be mounted on an automobile seat. Furthermore, the device is easy to operate inasmuch as one control valve need only be turned from empty to fill positions to fill each cushion compartment. There is no need to continually operate several valves to fill a single cushion compartment. The device is also economical to manufacture since the control valve assembly and seat cushion are made of extremely simple, inexpensive components and can conveniently be injection molded from plastic.

Furthermore, since the pressure of each of the cushion compartments can be adjusted by turning a single valve, the attention of an automobile driver will not be unduly distracted by having to operate several valves to fill a single compartment. The operation of the seat cushion assembly is made even less distracting by the positioning of the valves and control knobs on the manifold block. As is evident from FIGS. 1, 2, 3, 5 and 15, the control knobs are arrayed on the control assembly to correspond to the relative positions of the compartments on the seat cushion. Knobs 73, 74 and 75 which operate compartments 14, 15 and 16, respectively, are positioned in a straight line corresponding to the positions of compartments 14, 15 and 16, one over the other. Knobs 77 and 79 which control compartments 17 and 18, respectively, are positioned to either side of the line of knobs 73, 74 and 75, just as compartments 17 and 18 are positioned to either side of the vertical row of compartments 14–16. Therefore, little concentration is required to locate the proper knob for a compartment to be inflated or deflated.

Figure 21:
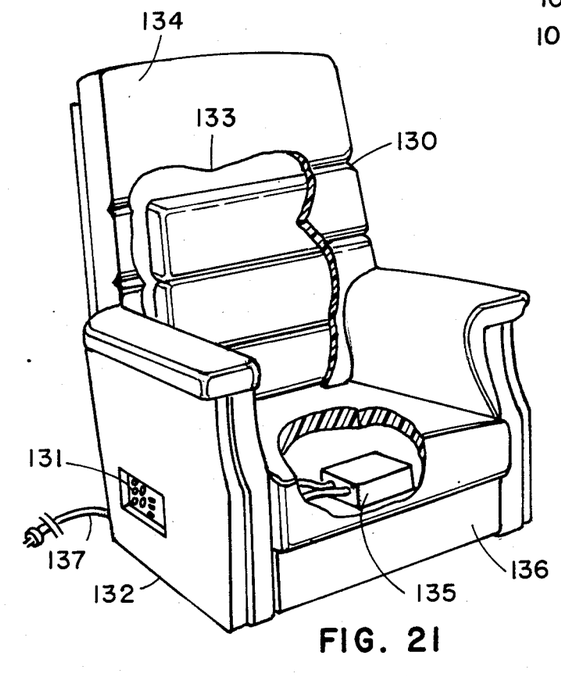
FIG. 21 is a perspective view of a lounge chair incorporating the inflatable seat cushion assembly of the present invention.

As shown in FIG. 21, the seat cushion assembly of the present invention can also be incorporated into a conventional lounge chair 130. Control valve assembly 131 can be mounted on a side panel 132 of the chair, and the seat cushion can be positioned behind upholstery 133 of seat back 134. Compressor 135 is hidden from view in base 136 of the chair. Compressor 135 can be connected to a conventional AC outlet by a cord 137.

Figures 22, 24:
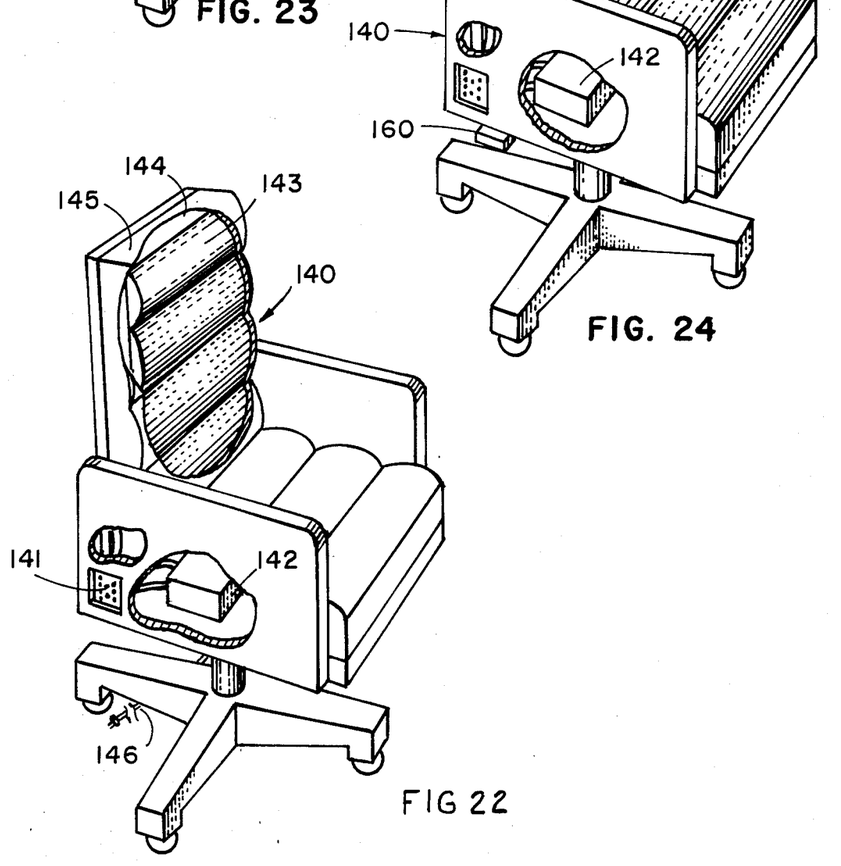
FIG. 22 is a perspective view of an office chair incorporating the inflatable seat cushion assembly of the present invention.
FIG. 24 is a partially broken perspective view of an office chair having another modified inflatable seat cushion assembly of the present invention.

The same arrangement can be employed in a pedestal based desk arm chair 140, as shown in FIG. 22. Control valve assembly 141 can be incorporated into an arm of the chair and compressor 142 beneath the seat of the chair. Seat cushion 143 is positioned beneath upholstery 144 of chair back 145. Compressor 142 can be connected by a cord 146 to a conventional AC outlet.

Figure 23:
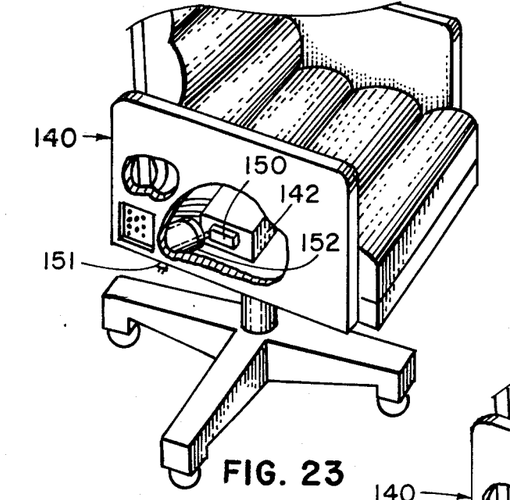
FIG. 23 is a partially broken perspective view of an office chair having a modified inflatable seat cushion assembly of the present invention.

Alternatively, as shown in FIG. 23, the compressor can be adapted for operation by a battery 150. A cord 151 retractable by means of a reel 152 positioned below the seat of the chair can be used for intermittent charging of battery 150.

It is also possible, as shown in FIG. 24, to run compressor 142 by a plug-in rechargeable battery 160. When charged, battery 160 can be plugged into the side of the chair for operating compressor 142. When battery 160 discharges, it can be recharged by unplugging it from the chair and plugging it into any conventional AC outlet for a sufficient period of time.

Having described the preferred embodiments of the invention, it will be recognized by those skilled in the art that modifications can be made without departing from the principles of the invention. Such modifications are to be considered as included in the appended claims unless these claims, by their language, expressly state otherwise.

The embodiments of the invention in which an exclusive property or privilege is claimed are defined as follows:

1. An inflatable seat cushion assembly, comprising:
   a seat cushion having a plurality of inflatable compartments;
   a manifold block having integrally formed therewith:
   a connector conduit for each of said compartments, a first end of each connector conduit in fluid communication with an associated one of said compartments and each connector conduit having a second end,
   said connector conduits formed by grooves in the exterior surface of said manifold block and a first cover plate disposed to cover said connector conduit grooves sealingly, said covered connector conduit grooves forming said connector conduits,
   a pressure manifold with a common pressure inlet having means for connection to a pressurized fluid source and said pressure manifold having a lateral pressure outlet for each compartment, each lateral pressure outlet establishing fluid communication between said common pressure inlet and an associated one of said connector conduit second ends,
   an exhaust manifold with exhaust outlet means for the common exhaust of spent fluid from said compartments and a lateral exhaust inlet for each said compartment, each lateral exhaust inlet establishing fluid communication between an associated one of said connector conduit second ends and said exhaust outlet means, said exhaust manifold being separate from said pressure manifold,
   said lateral pressure outlets of said pressure manifold and said lateral exhaust inlets of said exhaust manifold formed by grooves in the exterior surface of said manifold block and a second cover plate disposed to cover said grooves sealingly, forming manifold conduits between said grooves and said second cover plate,
   a fluid communication juncture formed at each of said connector conduit second ends between associated ones of said lateral pressure outlets, said lateral exhaust inlets and said connector conduits, and a recess between each of said lateral outlets and its corresponding lateral inlet;

a control valve at each of said junctures and seated within said recess, wherein each control valve is selectively adjustable among an inflation position, an exhaust position and a closed position, where in said inflation positions said associated compartment communicates with said corresponding lateral pressure outlet through an associated connector conduit for inflating said compartment, where in said exhaust position said associated compartment communicates with said corresponding lateral exhaust inlet through an associated connector conduit for deflating said compartment through said exhaust outlet means, and where in said closed position fluid communication is prevented between said associated compartment and both the pressure source and said exhaust; and each said control valve having an actuator, and and aperture provided through one of said cover plates for each of said control valves through which said valve actuator passes for selectively adjusting said control valve.

2. The inflatable seat cushion assembly as recited in claim 1 which further comprises pressure sensitive switch means in fluid communication with said common pressure inlet for ceasing the flow of fluid into said common pressure inlet if the pressure in said pressure manifold reaches a certain maximum predetermined level.

3. The inflatable seat cushion assembly as recited in claim 1 wherein each said control valve includes a spool valve with a passage therethrough which can be selectively aligned by said actuator to establish communication between a lateral pressure outlet and a connector conduit for inflating a compartment, to establish communication between a lateral exhaust inlet and a connector conduit for deflating a compartment, or to prevent fluid from flowing into and out of a connector conduit to and from a compartment.

4. The inflatable seat cushion assembly as recited in claim 3 wherein said connector conduit grooves are formed on one side of said manifold block and said manifold grooves are formed on another side of said manifold block; and an aperture extends through the bottom of each of said recesses to a connector conduit groove, wherein said aperture is aligned with the passage through the associated spool valve in said recess; and wherein said passage is selectively alignable with the lateral exhaust inlet or the lateral pressure outlet in its recess to deflate or inflate an associated compartment or movable to a position where said passage is not aligned with either the lateral exhaust inlet or the lateral pressure outlet to prevent fluid from passing into or out of said associated compartment.

5. The inflatable seat cushion assembly as recited in claim 4 which further comprises means for suspending said seat cushion from the back of a chair seat.

6. The inflatable seat cushion assembly as recited in claim 5 which further comprises an air compressor having an outlet for compressed air, wherein said compressor outlet is operably connected with said common pressure inlet of said pressure manifold.

7. The inflatable seat cushion assembly as recited in claim 5 which further comprises an air fill valve connected to said common pressure inlet, wherein said air fill valve is connected to an air fill coupler on an air compressor.

8. The inflatable seat cushion assembly as recited in claim 5, further comprising:
said inflatable seat cushion assembly mounted on a chair; and
an electrically operated pressurized fluid compressor within said chair, said compressor having an outlet in fluid communication with said common pressure inlet of said pressure manifold.

9. The inflatable cushion assembly as recited in claim 8 which further comprises: a removable rechargeable battery operably connected to said compressor so as to supply power thereto.

10. The inflatable cushion assembly as recited in claim 8 which further comprises: a rechargeable battery operably connected to said compressor and mounted on said chair for supplying power to said compressor, and a retractable electric cord for periodic connection to a conventional electrical outlet to recharge said mounted rechargeable battery.

11. An inflatable seat cushion assembly, comprising:
a seat cushion having a plurality of inflatable compartments;
a manifold block having integrally formed therewith:
a connector conduit for each of said compartments, a first end of each connector conduit in fluid communication with an associated one of said compartments and each connector conduit having a second end,
a pressure manifold with a common pressure inlet having means for connection to a pressurized fluid source and said pressure manifold having a lateral pressure outlet for each compartment, each lateral pressure outlet establishing fluid communication between said common pressure inlet and an associated one of said connector conduit second ends,
an exhaust manifold with exhaust outlet means for the common exhaust of spent fluid from said compartments and a lateral exhaust inlet for each said compartment, each lateral exhaust inlet establishing fluid communication between an associated one of said connector conduit second ends and said exhaust outlet means, said exhaust manifold being separate from said pressure manifold,
·said lateral pressure outlets of said pressure manifold and said lateral exhaust inlets of said exhaust manifold formed by grooves in the exterior surface of said manifold block and a cover plate disposed to cover said grooves sealingly, forming manifold conduits between said grooves and said cover plate,
a fluid communication juncture formed at each of said connector conduit second ends between associated ones of said lateral pressure outlets, said lateral exhaust inlets and said connector conduits, and
a recess between each of said lateral outlets and its corresponding lateral inlet;
a control valve at each of said junctures and seated within said recess, wherein each control valve is selectively adjustable among an inflation position, an exhaust position and a closed position, where in said inflation position said associated compartment communicates with said corresponding lateral pressure outlet through an associated connector. conduit for inflating said compartment, where in said exhaust position said associated compartment communicates with said corresponding lateral exhaust inlet through an associated connector conduit for deflating said compartment through said exhaust outlet means, and where in said closed position fluid communication is prevented between said associated compartment and both the pressure source and said exhaust; and each said control valve having an actuator, and an aperture provided through one of said cover plates for each of said control valves through which said valve actuator passes for selectively adjusting said control valve.

* * * * *